Patented Feb. 5, 1924.

1,482,601

UNITED STATES PATENT OFFICE.

SVEIN DAHL-RODE, OF BROOKLYN, NEW YORK.

METHOD OF MAKING WATER-SOFTENING MATERIAL.

No Drawing.    Application filed February 9, 1923. Serial No. 618,120.

*To all whom it may concern:*

Be it known that I, SVEIN DAHL-RODE, a subject of the King of Norway, residing in the borough of Brooklyn, in the county of Kings and State of New York, have invented a certain new and useful Improvement in the Methods of Making Water-Softening Material, of which improvement the following is a specification.

This invention relates to the method of making material for use in softening water, such as used at hotels, laundries, and other places, and has for its objects to increase the efficiency of the reaction, and to cheapen the cost of production. For this purpose I make use of materials which may be had in large quantities at low cost, such as slag from iron furnaces, which is composed largely of silicates of aluminum, iron, and calcium. The slag may be powdered in any suitable or preferred manner, as by dropping the slag into water while molten; then after cooling, pulverizing the same by means of a ball mill.

According to my improvement, the slag in powdered form is treated as follows:

First it is mixed with solid sodium hydroxide (caustic soda) in equal parts, and to about one thousand grams of the mixture add from 200 to 400 cubic centimeters of water, boil the mixture until it reaches the consistency of a thick paste. It is then run into a tray and all the water is evaporated at a temperature not exceeding about 250 degrees C.

This caustic soda treatment is for the purpose of separating the original combination of oxides and converting them into compounds of higher exchange power, such as double compounds of sodium and calcium aluminum silicate.

After thoroughly drying out the mixture, it is ground up into pieces of suitable size, such as 20 to 30 mesh, and then treated in a boiling solution of sodium silicate of 10 to 20 degrees Bé. until hard This usually requires from one half hour to one hour.

The compound thus produced may be used for water softening, but further treatment may be added to the process. After the treatment with sodium silicate, the material may be rehydrated in a boiling solution of sodium hydroxid for a short time, say about one-half hour after which the excess of caustic soda is washed out with water, and the material is then neutralized with 5° Bé. solution or aluminum sulphate for several hours, or over night. The material is then dried at a temperature of from 100 to 150 degrees C., thus completing the process.

According to another modification, the material, after treatment with soda silicate solution, may be treated directly with a boiling 5° Bé. solution of alum for about one-half hour, and then dried.

The completed compound may then be placed in a filter in the path of the flowing hard water, which is to be softened, and during its passage through the filter the calcium contained in the water is exchanged for the sodium in the compound.

Having now described my invention, what I claim as new and desire to secure by Letters Patent is:

1. The method of making a water softening compound, which consists in mixing iron furnace slag in powdered form with caustic soda, then adding water and boiling the mixture to the consistency of a thick paste, then drying out the mixture, and treating the same with a boiling solution of sodium silicate.

2. The method of making a water softening compound, which consists in mixing iron furnace slag in powdered form with caustic soda in substantially equal parts, then adding water and boiling the mixture to a thick paste, then spreading out the paste in a thin layer and applying heat to drive off all water, and then treating the material with a boiling solution of sodium silicate.

3. The method of making a water softening compound, which consists in mixing iron furnace slag in powdered form with caustic soda in substantially equal parts, then adding water and boiling the mixture to a thick paste, then drying out the mixture and grinding same to a suitable size, and then treating the material with a boiling solution of sodium silicate.

4. The method of making a water softening compound, which consists in mixing iron furnace slag in powdered form with caustic soda in substantially equal parts, then adding water and boiling the mixture to a thick paste, then drying out the mixture, then treating the same with a boiling solution of sodium silicate, and then treating with a boiling solution of alum.

5. The method of making a water softening compound, which consists in mixing iron furnace slag in powdered form with caustic soda in substantially equal parts, then adding water and boiling the mixture to a thick paste, then drying out the mixture and grinding same to a suitable size, then treating the material with a boiling solution of sodium silicate until hard, then treating with a boiling solution of alum and afterward drying out the material.

6. The method of making a water softening compound which consists in mixing iron furnace slag in powdered form with caustic soda and water, then drying and breaking up to a suitable degree of fineness, and then treating the material with a solution of sodium silicate.

In testimony whereof I have hereunto set my hand.

SVEIN DAHL-RODE.